United States Patent [19]

Ritter et al.

[11] Patent Number: 4,496,820
[45] Date of Patent: Jan. 29, 1985

[54] MULTISPOT ELECTRICAL RESISTANCE WELDING MACHINE

[75] Inventors: Gerhard Ritter; Klaus Ritter, both of Graz; Gerhard Jahrbacher, Peggau, all of Austria

[73] Assignee: Evg Entwicklungs- und Verwertungs-Gesellschaft m.b.H., Graz, Austria

[21] Appl. No.: 558,163

[22] Filed: Dec. 5, 1983

[30] Foreign Application Priority Data

Dec. 14, 1982 [AT] Austria ................................ 4539/82

[51] Int. Cl.³ .............................................. B23K 9/28
[52] U.S. Cl. ...................................... 219/87; 219/108
[58] Field of Search ............................ 219/87, 88, 108

[56] References Cited

U.S. PATENT DOCUMENTS 3,139,504 6/1964 Ramstein et al. ...................... 219/87
3,735,089 5/1973 Sciaky ..................................... 219/87

FOREIGN PATENT DOCUMENTS 351904 8/1979 Austria.

Primary Examiner—Clifford C. Shaw
Attorney, Agent, or Firm—Ernest F. Marmorek

[57] ABSTRACT

In a multispot resistance welding machine, the electrodes (8,9) of which are fed with D.C. pulses from a rectifier unit (2) via two busbars (5,7) running across the welding machine, the busbars (5,7) are arranged on opposite sides of the plane of weld and the two poles (1,3) of the rectifier unit (2) are connected each to one of the opposite ends of the two busbars (5,7). The busbars (1,3) from the rectifier unit (2) are arranged parallel with the busbars (5,7) feeding the electrodes and the busbars (5,7) are at equal distances away from the centerline of the busbars (1,3) and are connected directly or via short leads to the electrides (8 and 9 resp.). Alternatively the two poles of a second rectifier unit arranged antisymmetrically with respect to the first rectifier unit on the opposite side of the plane of weld, are connected in parallel to the opposite ends of the two busbars.

14 Claims, 13 Drawing Figures

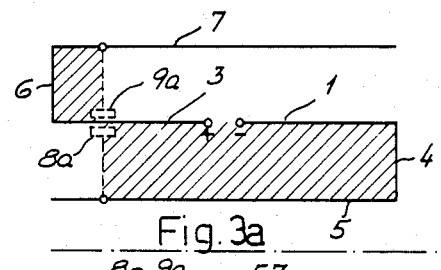
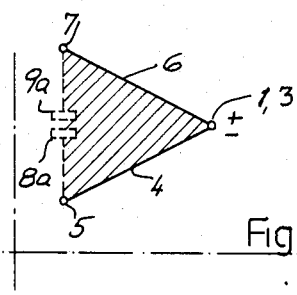
Fig. 3a    Fig. 3b
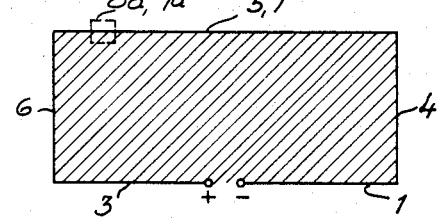
Fig. 3c
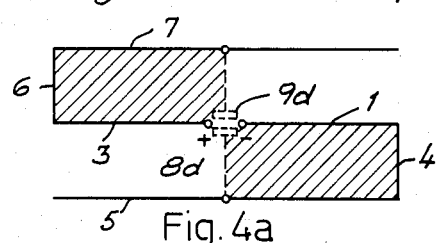
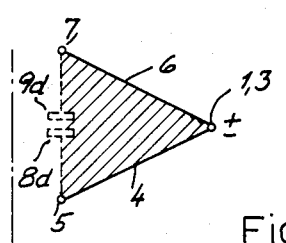
Fig. 4a    Fig. 4b
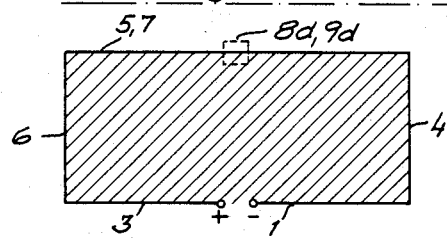
Fig. 4c
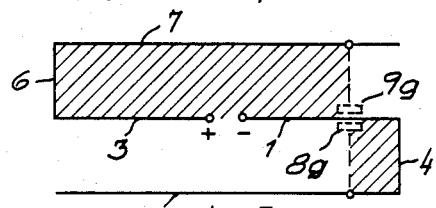
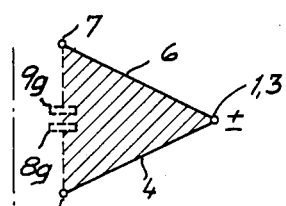
Fig. 5a    Fig. 5b
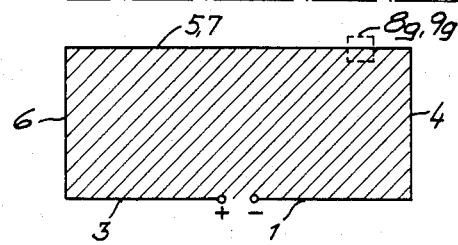
Fig. 5c

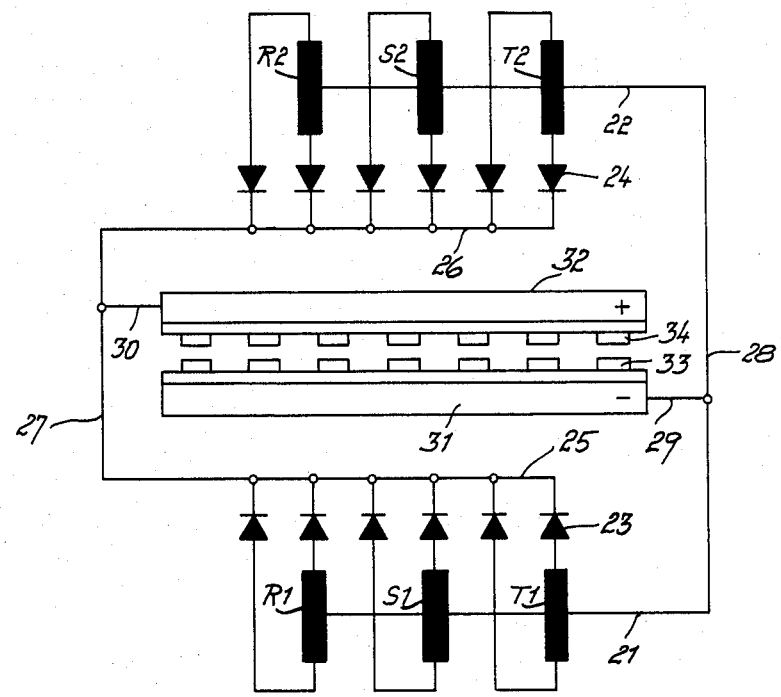
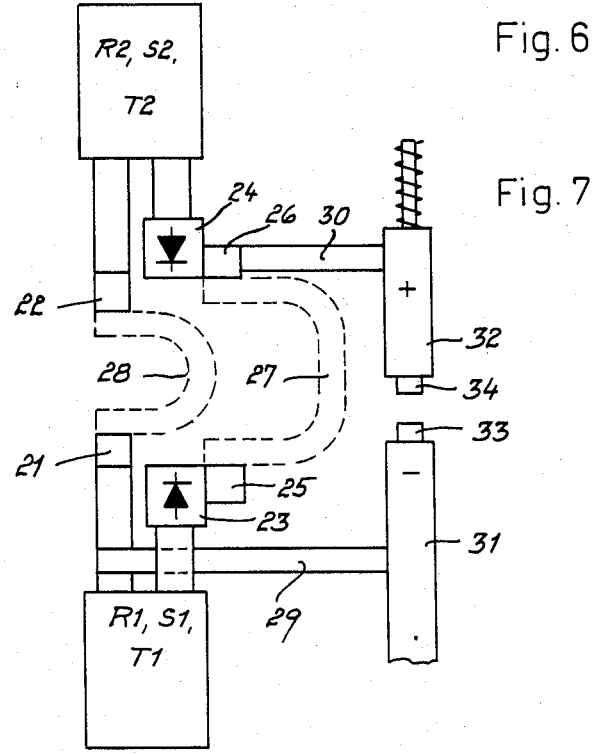
Fig. 6
Fig. 7

MULTISPOT ELECTRICAL RESISTANCE WELDING MACHINE

The invention relates to a multispot resistance machine in which current pulses from a transformer fed rectifier unit are fed to the points of weld via two busbars running across the welding machine. Such machines are used in particular for the welding of grids from longitudinal and cross wires.

A machine of this type is known from Austrian Pat. No. AT-B-351904, issued on Aug. 27, 1979. The welding electrodes and the current feeds in this machine are arranged as usual in multispot resistance welding machines operated by A.C. and working in accordance with the so-called doublespot welding method. That is to say two busbars, fed from transformers and carrying rider electrodes connected conductively alternately to the busbars of opposite polarity are arranged on the same side of the plane of production of the grid, the circuit through each pair of spot welds being closed on the opposite side by a passive current bridge.

This machine offers all of the advantages of D.C. welding, in particular a very favourable formation and high strength of the spot welds, but has the disadvantage of all of the known machines which work with current bridges, namely, that the resetting of the machine from one given pitch of the longitudinal wires to another is very timewasting and also expensive. This is because sets of current bridges must be provided to correspond with the different pitches of the longitudinal wires so that the set of current bridges must be changed for a different set when going over to a different longitudinal wire pitch.

The invention originates from the fact that the resetting of the longitudinal wires to different pitches, in a welding machine in which the electrodes are fed via busbars, is considerably simpler if the busbars are arranged on opposite sides of the production plane of the grid so that instead of the double spot welding method the single spot welding method is used, in which each spot weld lies directly between a positive and a negative electrode.

In theory, to achieve uniform welds with single spot welding stages which are fed with D.C. via busbars, it should be sufficient to consider that the effective resistances are equal in all the welding current circuits. However, surprisingly, in practice it has proved that this measure is inadequate and that, on the contrary, the busbars and the leads to them must have a particular arrangement.

Since, in the production of welded grids, modern multispot resistance welding machines work at a very high number of strokes (more than 100 crosswires per minute being welded onto the longitudinal wires) the welding current in fact is switched on and off again about twice a second, and the actual time of switching-on during which current is flowing, is very short, amounting to only about two to three cycles of the A.C. The consequence of this method, working necessarily with short current pulses, is that the effects of the build-up and collapse of magnetic fields make themselves felt very strongly disadvantageously. Consequently, in order to ensure uniform welds, for each individual spot weld along the line of weld stretching across the width of the machine, the most equal conditions possible must be created as regards the inductive resistances.

According to the present invention a multispot electrical resistance welding machine comprises a plurality of electrodes, said electrodes defining a plurality of weld points and thereby defining a welding plane; a first pair of busbars, connected to said electrodes, extending across said machine; parallel to said first pair of busbars, said second busbars being equally spaced from the centre line of said first pair of busbars, one of said second pair of busbars being connected to one end of one of said first pair and the other of said second pair of busbars being connected to the other end of the other of said first pair; and a rectifier unit having first and second poles connected to respective ones of said second pair of busbars.

According to a second aspect of the invention a multispot electrical resistance welding machine comprises a plurality of electrodes, said electrodes defining a plurality of weld points and thereby defining a welding plane; a first pair of busbars, connected to said electrodes, extending across said machine; a second pair of busbars extending across said machine parallel to said first pair of busbars, said second busbars being equally spaced from the centre line of said first pair of busbars, one of said second pair of busbars being connected to one end of one of said first pair and the other of said second pair of busbars being connected to the other end of the other of said first pair; a third pair of busbars extending across said machine parallel to said first and second pairs, said third busbars being equally spaced from the centerline of said first pair of busbars, one of said third pair of busbars corresponding to said one of said second pair being connected to said one end of said one busbar of said first pair and the other of said third pair of busbars corresponding to said other of said second pair being connected to said other end of said other of said first pair; and a pair of rectifier units, one disposed on each side of said welding plane, a first of said rectifier units having first and second poles connected to respective ones of said second pair of busbars and the second of said rectifier units having first and second poles connected to respective ones of said third pair of busbars in parallel with said first rectifier unit.

As will be explained more exactly later, through the specified arrangement and feeding of the busbars not only can essentially equal lengths of current path be ensured via all of the points of weld and thereby essentially equally effective resistances in the welding current circuits, but also the inductive effects in the individual welding current circuits can be matched essentially with one another.

In a simple embodiment of the invention, which enables subsequent balancing of the inductivity, on the one side of the plane of weld the welding electrodes are carried or formed directly by the one busbar whilst on the opposite side of the plane of weld lie individually adjustable electrodes which are connected to the second busbar via leads containing adjustable impedances, preferably stub leads with an adjustable slide.

The inductive effects in the welding current circuits are advantageously kept small from the outset if all of the parts of the machine in the region near to the busbars, in particular the bearer beam and pressure beam for the electrodes, consist of non-magnetic material, e.g., of non-magnetic steel.

For the same purpose the parts of the columns of the frame of the machine lying on opposite sides of the pressure beam for the electrodes should have a clearance from the outermost electrodes which amounts to a multiple of the distance apart of the electrodes.

Embodiments of the invention will now be described in greater detail with reference to the drawings, in which.

FIGS. 3a–3c, 4a–4c, and 5a–5c show diagrammatically the areas around which the current flows to feed selected electrodes, respectively in front elevation (FIGS. 3a, 4a, 5a), side elevation (FIGS. 3b, 4b, 5b) and plan (FIGS. 3c, 4c, 5c);

FIG. 6 shows the wiring diagram of a second embodiment in accordance with the invention; and, FIG. 7 shows a side elevation with respect to FIG. 6.

Figure 1:
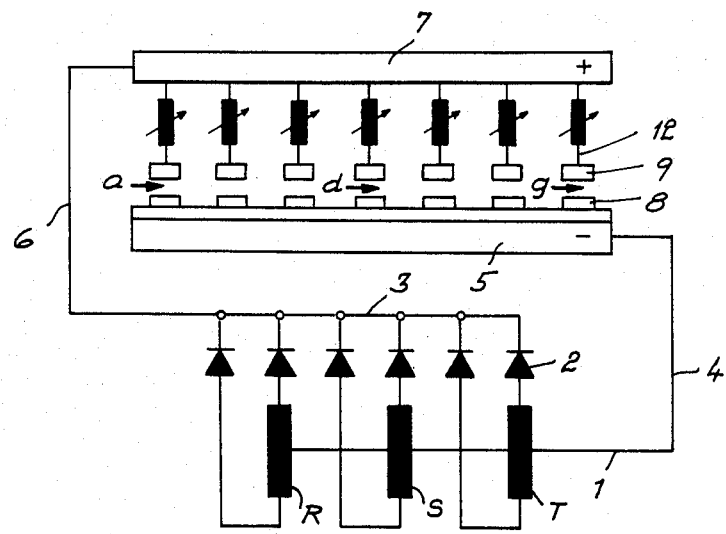
FIG. 1 shows the wiring diagram of a first embodiment in accordance with the invention.

In FIG. 1 can be seen the secondary windings of transformers R,S,T, associated with the three phases of a threephase network, their midpoint tappings being connected to a busbar 1 and their ends being connected via interposed rectifier diodes 2 to a busbar 3. In this circuit the busbar 1 forms the negative and the busbar 3 the positive pole of a rectifier unit.

The busbar is connected electrically via a lead 4 to a busbar 5 stretching straight across the whole width of the machine below the welding plane. In the chosen embodiment the lead 4 is connected to the right-hand end of the busbar 5. The busbar 3 is connected via a lead 6 to the left-hand end of the busbar 7 stretching straight across the width of the machine above the welding plane. This lead 6 is formed by flexible conductive strips which are carried past the busbar 5 at the side, shown in FIG. 2 in dotted line.

The lower electrodes 8 are connected directly to the busbar 5 and the upper electrodes 9 are mounted on electrode carriers 10 which are supported elastically by springs 11 from a pressure beam of known construction (not shown) which can be moved up and down and which also carries the busbar 7. The electrodes 9 are connected conductively to the busbar 7 via short flexible strips 12.

From FIG. 1 it may be seen directly that the effective resistances with respect to all of the electrodes must be equal because the length of path covered by the current in the busbar 7 from its connection to the lead 6 as far as any one electrode 9 and the length of path covered by the current in the busbar 5 from the electrode 8 associated with the above electrode 9 as far as the connection to the lead 4 always add up to the same total length of path and the remaining lengths of lead are in any case the same for all electrodes.

In order to create the same conditions for all the electrodes with respect also to the inductive impedances, in accordance with a first embodiment of the invention, the arrangement is such that the busbars 5 and 7 are arranged at equal distances from the centreline M of the busbars 1 and 3 to which they are parallel. Assuming furthermore that the strips 12 are as short as possible, the volumes enclosed by the conductors are as illustrated in FIGS. 3 to 5, where in FIGS. 3 to 5 the centre of the busbar 3 is designated by "+" and the centre of the busbar 1 is designated by "−".

FIG. 1 shows seven pairs of electrodes 8, 9 and FIGS. 3 to 5 refer especially to the supply leads to the extreme left-hand pair of electrodes, to the centre pair of electrodes and to the extreme right-hand pair of electrodes, these pairs of electrodes 8, 9 have been characterized by the additional letters a, d and g.

As may be seen from FIGS. 3a, 4a and 5a, the current in each case flows from the busbar 3 via the lead 6 into the busbar 7 and along it as far as the electrode 9a, 9d or 9g under consideration at the time. From the latter the current flows through the material which is to be welded (not shown) to the associated counterelectrode 8a, 8d or 8g, and then into the busbar 5 and along it to the lead 4 and finally into the busbar 1. As revealed by the plans according to FIGS. 3c, 4c and 5c, the current in each case flows round a rectangle which is enclosed by the leads 3, 6, 5 or 7, 4 and 1. However as the side elevations in FIGS. 3b, 4b and 5b show, the current also flows in each case round a triangle, the corners of which are the leads 1 or 3 respectively, 5 and 7. From that it follows that the volumes round which the current flows and thereby also the inductive resistances for any and every electrode must be equal.

Figure 2:
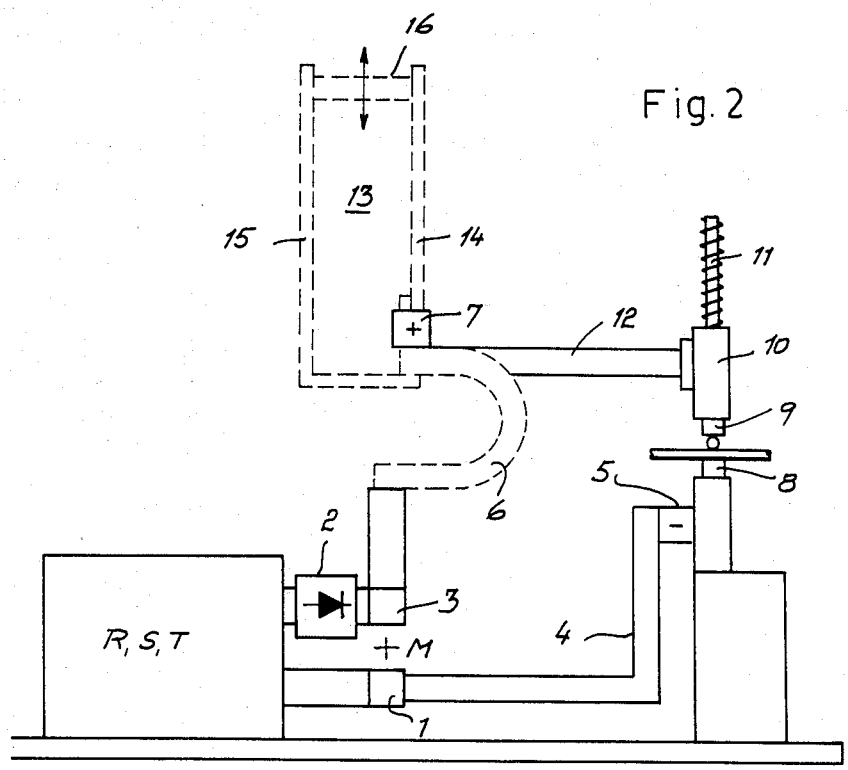
FIG. 2 shows a side elevation of the machine of FIG. 1.

Unbalance which originates in the strips 12 which although kept as short as possible nevertheless exist, may in accordance with the preferred embodiment of the invention shown in FIG. 2, be eliminated if, in the conductive path 12 between the busbar 7 and each electrode 9 another adjustable impedance 13 is provided, which may be formed, say, from two parallel stub leads 14, 15 and a conductive slide 16 which can be shifted along them.

In order to keep the inductive resistances low from the outset it is important that all of the parts of the machine arranged in the region close to the current paths, in particular the bearer beam and pressure beam for the electrodes are, as far as possible, produced from non-magnetic material, e.g., non-magnetic steel. For the same purpose the parts of the columns of the frame of the machine should be arranged at a greater clearance from the outermost electrodes 8a, 9a and 8g, 9g, which amounts to a multiple of the distance apart of the electrodes.

A particularly advantageous embodiment of the invention is shown in FIGS. 6 and 7. In this embodiment two sets of transformers R1, S1, T1 and R2, S2, T2, with associated rectifier units, are arranged at equal distances from the plane of production of the grid on opposite sides of it.

The midpoint tappings of the secondary windings of the transformers as shown are connected conductively to the negative busbars 21, 22 and the rectifier diodes 23, 24 of the rectifier units are connected conductively to the positive busbars 25, 26. By means of strips 27, 28 carried around the row of welding electrodes at the side, the two rectifier units are connected electrically in parallel, the right-hand end of the lower busbar 31 being connected via a lead 29 to the busbars 21, 22 and the left-hand end of the upper busbar 32 via a lead 30 to the busbars 25 and 26. In this embodiment the welding electrodes 33, 34 may be arranged directly on the busbars 31, 32 or actually formed from them.

As a result of the completely symmetrical configuration of the feed circuits with respect to the plane of production of the grid, equal resultant effective resistances and reactances are ensured in the paths of the current to all of the pairs of welding electrodes.

We claim:

1. An electric multispot resistance welding machine, for example, one particularly suited for the production of welded wire mesh, in which pulses of welding current are fed from a transformer-fed rectifier unit, by way of busbars, to a plurality of welding electrodes defining a welding plane, comprising, in combination, said bus bars, including a first pair of bus bars, each disposed substantially parallel to the other and at opposite sides of said welding plane, each welding electrode being adapted to be conductively connected to one of said bus bars of said first pair, a second pair of bus bars, arranged along a longitudinal axis of symmetry, and substantially parallel to the bus bars of said first pair, each bus bar of the first pair being spaced apart for the same distance from said axis of said second pair, a set of rectifier units, each terminal of said rectifier units being conductively connected to one of said bus bars of said second pair, one end of one said bus bar of said first pair being conductively connected to one of said bus bars of the second pair, and the opposite end of the other bus bar of said first pair being conductively connected to the other bus bar of said second pair.

2. A welding machine according to claim 1, wherein the welding electrodes on one side of said welding plane are carried directly on the respective busbar, and including a plurality of short leads, said short leads connecting the welding electrodes on the other side of said welding plane to the other busbar.

3. A welding machine according to claim 2, including adjustable impedances incorporated in said short leads.

4. A welding machine according to claim 3, wherein said adjustable impedances include adjustable slides.

5. A welding machine according to claim 1, wherein all parts of said machine adjacent said busbars comprise non-magnetic material.

6. A welding machine according to claim 1, wherein said machine includes a frame, said frame having column parts spaced from the outermost electrodes a distance equal to a multiple of the distance between the electrodes.

7. An electric multispot resistance welding machine, for example, one particularly suited for the production of welded wire mesh, in which pulses of welding current are fed from a transformer fed rectifier unit by way of bus bars to a plurality of welding electrodes defining a welding plane, comprising, in combination, said bus bars including a first pair of bus bars, the bus bars of said first pair being arranged substantially parallel to one another at opposite sides of said welding plane, each bus bar of said first pair being conductively connected to one of said welding electrodes, a second and third pair of bus bars, the bus bars of said second and said third pairs being substantially parallel to said bus bars of said first pair and at opposite sides of, and equally spaced from, said welding plane, and equally spaced from a longitudinal axis of symmetry of said first pair, two sets of rectifier units at opposite sides of and equally spaced from said welding plane, each terminal of said rectifier units being conductively connected to a respective bus bar of said second and third pairs, bus bars of the same polarity of said second and third pairs being conductively connected to one another and to one of said bus bars of said first pair at one of their ends, opposite to the ends at which respective said bus bars of opposite polarity of said second and third pairs are connected to one another and to the other bus bar of said first pair.

8. A welding machine according to claim 7, wherein the welding electrodes on one side of said welding plane are carried directly on the respective busbar, and including a plurality of short leads, said short leads connecting the welding electrodes on the other side of said welding plane to the other busbar.

9. A welding machine according to claim 8, including adjustable impedances incorporated in said short leads.

10. A welding machine accoding to claim 9, wherein said adjustable impedances include adjustable slides.

11. A welding machine according to claim 7, wherein all parts of said machine adjacent said busbars comprise non-magnetic material.

12. A welding machine according to claim 7, wherein said machine includes a frame, said frame having column parts spaced from the outermost electrodes a distance equal to a multiple of the distance between the electrodes.

13. A welding machine according to claim 7, wherein a first of each of said second and third pairs of busbars supports respective ones of said electrodes, said respective first second and first third electrodes being movable relative to one another.

14. A welding machine according to claim 13, wherein said respective first second and first third busbars form said electrodes.

* * * * *